(12) United States Patent
Malur Srinivasan et al.

(10) Patent No.: US 12,001,489 B1
(45) Date of Patent: Jun. 4, 2024

(54) ETHICS-BASED MULTI-MODAL USER POST MONITORING

(71) Applicant: Fujitsu Limited, Kawasaki (JP)

(72) Inventors: Ramya Malur Srinivasan, San Diego, CA (US); Kanji Uchino, Santa Clara, CA (US)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 18/159,103

(22) Filed: Jan. 25, 2023

(51) Int. Cl.
| G06F 16/906 | (2019.01) |
| G06F 16/583 | (2019.01) |
| G06F 16/783 | (2019.01) |
| G06F 16/9035 | (2019.01) |

(52) U.S. Cl.
CPC .......... G06F 16/906 (2019.01); G06F 16/583 (2019.01); G06F 16/7834 (2019.01); G06F 16/9035 (2019.01)

(58) Field of Classification Search
CPC .. G06F 16/906; G06F 16/583; G06F 16/7834; G06F 16/9035
USPC ........................................................ 707/737
See application file for complete search history.

(56) References Cited

U.S. PATENT DOCUMENTS

| 8,386,574 | B2 * | 2/2013 | Chidlovskii | ........ G06F 18/2433 709/206 |
| 10,452,729 | B1 * | 10/2019 | Keegan | ................. G06F 16/958 |
| 10,769,661 | B1 * | 9/2020 | Agrawal | ............ G06Q 30/0275 |
| 2013/0204833 | A1 * | 8/2013 | Pang | ...................... G06Q 30/02 709/206 |
| 2016/0098473 | A1 * | 4/2016 | Hosokawa | .......... G06F 11/3476 707/737 |

(Continued)

FOREIGN PATENT DOCUMENTS

| CN | 107040450 A | * | 8/2017 | ............. G06F 17/18 |
| CN | 108345587 A | * | 7/2018 | ........... G06F 16/353 |

(Continued)

OTHER PUBLICATIONS

Y. Chen, et al., "Detecting Offensive Language in Social Media to Protect Adolescent Online Safety," 2012 International Conference on Privacy, Security, Risk and Trust and 2012 International Conference on Social Computing, Amsterdam, Netherlands, 2012, pp. 71-80.

(Continued)

*Primary Examiner* — Phuong Thao Cao
(74) *Attorney, Agent, or Firm* — Fujitsu Intellectual Property Center

(57) ABSTRACT

In an embodiment, a set of user posts and associated metadata are received. A parameterized logistic function is fit on the metadata. Each user post associated with the corresponding metadata is categorized, based on the fitted parameterized logistic function. A category-prior associated with each user post is determined, based on the clustered set of user posts. A set of multi-modal features associated with each user post is determined. Further, a feature likelihood for each user post is determined, based on the set of multi-modal features. A final category associated with each posts is determined, based on the category-prior and on the feature likelihood. Post categorization information is rendered based on the final category associated with each user post. The set of user posts is filtered based on the final category of each user post.

20 Claims, 5 Drawing Sheets

(56) References Cited

U.S. PATENT DOCUMENTS

| | | | | |
|---|---|---|---|---|
| 2018/0219817 A1* | 8/2018 | Zang | | H04L 67/535 |
| 2019/0370347 A1* | 12/2019 | Levy | | G06F 16/355 |
| 2021/0019531 A1* | 1/2021 | Long | | G06V 10/764 |
| 2021/0119951 A1* | 4/2021 | Santos | | G06F 40/284 |
| 2021/0248687 A1* | 8/2021 | Albert | | H04L 67/306 |
| 2022/0318499 A1* | 10/2022 | Xiao | | H04L 51/046 |

FOREIGN PATENT DOCUMENTS

| | | | | |
|---|---|---|---|---|
| CN | 112115334 A * | 12/2020 | | G06F 16/951 |
| CN | 112732921 A * | 4/2021 | | G06F 16/353 |
| CN | 114357170 A * | 4/2022 | | |
| CN | 114443844 A * | 5/2022 | | |
| CN | 114693341 A * | 7/2022 | | |
| CN | 115545039 A * | 12/2022 | | |
| ES | 2911173 T3 * | 5/2022 | | G06F 16/287 |
| WO | WO-2017177455 A1 * | 10/2017 | | G06F 16/353 |
| WO | WO-2022250909 A1 * | 12/2022 | | |

OTHER PUBLICATIONS

Cobbe, J., "Algorithmic Censorship by Social Platforms: Power and Resistance", Philos. Technol. 34, 739-766 (2021).

Dinakar, Karthik, et al. "Common Sense Reasoning for Detection, Prevention, and Mitigation of Cyberbullying (Extended Abstract).", Proceedings of the Twenty-Fourth International Joint Conference on Artificial Intelligence (IJCAI 2015).

K. Hao, et al., "AI still sucks at moderating hate speech", Artificial Intelligence, MIT Technology Review, June 4, 2021.

Hosseinmardi, Homa, et al. "Detection of cyberbullying incidents on the instagram social network." arXiv preprint arXiv:1503.03909 (2015).

Kender, J. R., et al., "Video genetics: A case study from youtube", In Proceedings of the 18th ACM international conference on Multimedia, pp. 1253-1258 (2010).

P. Mishra, et al., "Tackling online abuse: A survey of automated abuse detection methods." arXiv preprint arXiv:1908.06024v2 [cs.CL], Sep. 30, 2020.

C. Nobata, et al., "Abusive Language Detection in Online User Content", In Proceedings of the 25th International Conference on World Wide Web, pp. 145-153, Apr. 2016.

P. Röttger, et al., "Hatecheck: Functional Tests for Hate Speech Detection Models", arXiv preprint arXiv:2012.15606v2 [cs.CL] May 27, 2021.

A. Schmidt, et al., "A Survey on Hate Speech Detection Using Natural Language Processing.", In Proceedings of the Fifth International Workshop on Natural Language Processing for Social Media, Valencia, Spain, pp. 1-10, 2017.

D. Shah, et al., "Predictive Biases in Natural Language Processing Models: A Conceptual Framework and Overview.", arXiv:1912.11078v2 [cs.CL] Sep. 12, 2020.

E. Siapera, "AI Content Moderation, Racism and (de) Coloniality.", International Journal of Bullying Prevention 4, No. 1 (2022): 55-65.

S. Sood, "Automatic Identification of Personal Insults on Social News Sites", Power Point Presentation.

Xu, Jun-Ming, et al., "Learning from Bullying Traces in Social Media.", In Proceedings of the 2012 conference of the North American chapter of the association for computational linguistics: Human language technologies, pp. 656-666, 2012.

H. Zhong, et al., "Content-Driven Detection of Cyberbullying on the Instagram Social Network.", In IJCAI, vol. 16, pp. 3952-3958, 2016.

* cited by examiner

ETHICS-BASED MULTI-MODAL USER POST MONITORING

FIELD

The embodiments discussed in the present disclosure are related to ethics-based multi-modal user post monitoring.

BACKGROUND

Advancements in the field of Internet and world-wide-web have led to development of various social media platforms, which may host online posts from a large number of users. Typically, the social media platforms may be required perform content moderation to regulate content of the online posts. For example, moderation of the online posts may be required to avoid discrimination against certain communities based on factors, such as, race, age, gender, and the like. Further, moderation may be required to ensure authenticity and accuracy associated with the online posts to avoid spread of rumors or misinformation. As social media platforms may allow formation of user groups, the social media platform may be also required to regulate content that may be circulated in such groups to avoid growth of socially harmful ideologies, on the particular social media platform. However, content moderation on the social media platforms may be a non-trivial task due to various reasons such as, culturally sensitive nature of the online posts, various nuances of human communication, contextual nature of information in the online posts, and dynamically changing content.

With the emergence of Artificial Intelligence (AI)/Machine Learning (ML) techniques, some of the challenges associated the content moderation task may be addressed. For example, various AI/ML techniques may be used to analyze large volume of real-time content and perform automated content moderation. However, the use of AI/ML models for content moderation may blur boundaries between public and private communication, and thereby raise privacy concerns. Further, commercial priorities, such as, targeted advertisements, may be served to unaware users without their consent, based on analysis of the content/context of communication between the users. In addition, existing societal biases associated with the content may be increased in case the AI/ML techniques are not designed and trained properly. For example, an AI/ML model may be trained based on a statistically imbalanced dataset that may favor one section of the society, as compared to a marginalized community. When such AI/ML model is used for content moderation, the AI/ML model may produce results, which may be biased against the marginalized community.

The subject matter claimed in the present disclosure is not limited to embodiments that solve any disadvantages or that operate only in environments such as those described above. Rather, this background is only provided to illustrate one example technology area where some embodiments described in the present disclosure may be practiced.

SUMMARY

According to an aspect of an embodiment, a method may include a set of operations, which may include receiving a set of user posts and metadata associated with the received set of user posts. The set of operations may further include fitting a parameterized logistic function on the metadata associated with the received set of user posts. The set of operations may further include clustering each of the received set of user posts associated with corresponding metadata, based on the fitted parameterized logistic function. The set of operations may further include determining a category-prior associated with each of the received set of user posts, based on the clustered set of user posts. The set of operations may further include determining a set of multi-modal features associated with each of the received set of user posts. The set of operations may further include determining a feature likelihood for each of the received set of user posts, based on the determined set of multi-modal features. The set of operations may further include determining a final category associated with each of the received set of user posts, based on the determined category-prior and on the determined feature likelihood. The set of operations may further include rendering post categorization information based on the determined final category associated with each of the received set of user posts. The received set of user posts may be filtered based on the determined final category.

The objects and advantages of the embodiments will be realized and achieved at least by the elements, features, and combinations particularly pointed out in the claims.

Both the foregoing general description and the following detailed description are given as examples and are explanatory and are not restrictive of the invention, as claimed.

BRIEF DESCRIPTION OF THE DRAWINGS

Example embodiments will be described and explained with additional specificity and detail through the use of the accompanying drawings in which.

Figure 1:
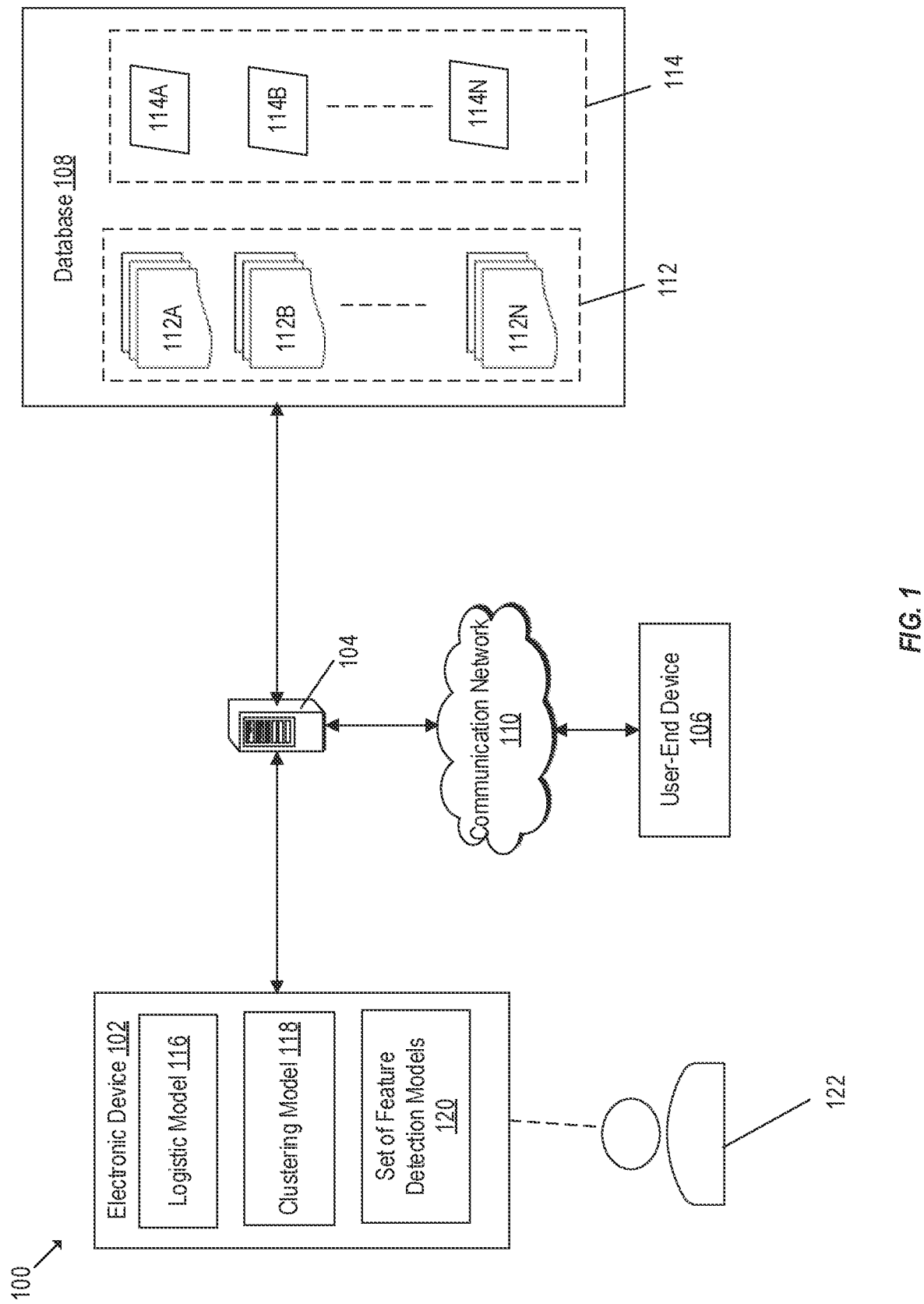
FIG. 1 is a diagram representing an example environment related to ethics-based multi-modal user post monitoring.

all according to at least one embodiment described in the present disclosure.

DESCRIPTION OF EMBODIMENTS

Some embodiments described in the present disclosure relate to methods and systems for ethics-based multi-modal user post monitoring. In the present disclosure, a set of user posts and metadata associated with the received set of user posts may be received. A parameterized logistic function may be fit on the metadata associated with the received set of user posts. Further, each of the received set of user posts associated with corresponding metadata may be clustered, based on the fitted parameterized logistic function. A category-prior associated with each of the received set of user posts may be determined, based on the clustered set of user posts. A set of multi-modal features associated with each of the received set of user posts may be determined. Further, a feature likelihood for each of the received set of user posts may be determined, based on the determined set of multi-modal features. Thereafter, a final category associated with each of the received set of user posts may be determined, based on the determined category-prior and on the determined feature likelihood. Further, post categorization information may be rendered, based on the determined final category associated with each of the received set of user posts. The received set of user posts may be filtered based on the determined final category.

According to one or more embodiments of the present disclosure, the technological field of automated content moderation may be improved by configuring a computing system (e.g., an electronic device) in a manner that the computing system may be able to execute ethics-based multi-modal user post monitoring. The computing system may receive a set of user posts and metadata associated with the received set of user posts. The computing system may fit a parameterized logistic function on the metadata associated with the received set of user posts. Further, the computing system may cluster each of the received set of user posts associated with corresponding metadata, based on the fitted parameterized logistic function. Thereafter, the computing system may determine a category-prior associated with each of the received set of user posts, based on the clustered set of user posts. Further, the computing system may determine a set of multi-modal features associated with each of the received set of user posts. Further, the computing system may determine a feature likelihood for each of the received set of user posts, based on the determined set of multi-modal features. Thereafter, the computing system may determine a final category associated with each of the received set of user posts, based on the determined category-prior and on the determined feature likelihood. Further, the computing system may render post categorization information, based on the determined final category associated with each of the received set of user posts. The received set of user posts may be filtered based on the determined final category.

Typically, various Artificial Intelligence (AI)/Machine Learning (ML) techniques may be used to analyze large volume of real-time content and perform automated content moderation. However, the use of AI/ML models for content moderation may blur boundaries between public and private communication, and thereby raise privacy concerns. Further, commercial priorities, such as, targeted advertisements, may be served to unaware users without their consent, based on analysis of the content/context of communication between the users. In addition, existing societal biases associated with the content may be increased in case the AI/ML models are not designed and trained properly. For example, an AI/ML model may be trained based on a statistically imbalanced dataset that may favor one section of the society, as compared to a marginalized community. When such AI/ML model is used for content moderation, the AI/ML model may produce results, which may be biased against the marginalized community The disclosed electronic device (i.e., the computing system), on the other hand, may execute automatic ethics-based multi-modal user post monitoring. The electronic device may fit a parameterized logistic function on metadata associated with a received set of user posts. Further, each of the received set of user posts associated with corresponding metadata may be clustered, based on the fitted parameterized logistic function. A category-prior associated with each of the received set of user posts may be determined, based on the clustered set of user posts. Further, a set of multi-modal features associated with each of the received set of user posts may be determined and the set of multi-modal features may be used to determine a feature likelihood for each of the received set of user posts. Thereafter, a final category associated with each of the received set of user posts may be determined, based on the determined category-prior and on the determined feature likelihood. Thus, the electronic device may use a two-level authentication for the ethical monitoring of the user posts. For example, a first level may correspond to the determination of the category-prior and a second level may correspond to the determination of the feature likelihood (from simple multi-modal features). The two-level authentication may save a computation time and improve an efficiency of the classification of the user posts. Further, the two-level authentication may also increase a likelihood that the classification of the user posts may be ethical. The disclosed technique may be applicable across social media platforms and may be language agnostic. In addition, as the disclosed technique may correspond to an unsupervised learning technique, labelled data may not be required for the classification of the user posts.

Embodiments of the present disclosure are explained with reference to the accompanying drawings.

FIG. 1 is a diagram representing an example environment related to ethics-based multi-modal user post monitoring, according to at least one embodiment described in the present disclosure. With reference to FIG. 1, there is shown an environment 100. The environment 100 may include an electronic device 102, a server 104, a user-end device 106, database 108, and a communication network 110. The database 108 may include a set of user posts 112 and metadata 114 associated with the set of user posts 112. The set of user posts 112 may include, for example, a first user post 112A, a second user post 112B, ... and an Nth user post 112N. The metadata 114 may include, for example, first metadata 114A (associated with the first user post 112A), second metadata 114B (associated with the second user post 112B), ... and Nth metadata 114N (associated with the Nth user post 112N). The electronic device 102 may include a logistic model 116, a clustering model 118, and a set of feature detection models 120. In FIG. 1, there is further shown a user 122 who may be associated with the electronic device 102 and/or may operate the electronic device 102. The set of user posts 112 and the metadata 114 shown in FIG. 1 is presented merely as an example and may include only one or more than "N" user posts and metadata associated with the corresponding user post, without departure from the scope of the disclosure.

The electronic device 102 may include suitable logic, circuitry, and interfaces that may be configured to execute ethics-based multi-modal user post monitoring. The electronic device 102 may use the logistic model 116 to fit a parameterized logistic function on the metadata 114 associated with the set of user posts 112. Further, the electronic device 102 may use the clustering model 118 to cluster each of the set of user posts 112 associated with corresponding metadata 114, based on the fitted parameterized logistic function. Thereafter, the electronic device 102 may determine a category-prior associated with each of the set of user posts 112, based on the clustered set of user posts 112. Further, the electronic device 102 may use the set of feature detection models 120 to determine a set of multi-modal features associated with each of the set of user posts 112. Further, the computing system may determine a feature likelihood for each of the set of user posts 112, based on the determined set of multi-modal features. Thereafter, the electronic device 102 may determine a final category associated with each of the set of user posts 112, based on the determined category-prior and on the determined feature likelihood. Further, the electronic device 102 may render post categorization information, based on the determined final category associated with each of the set of user posts 112. The set of user posts 112 may be filtered based on the determined final category associated with the set of user posts 112. Examples of the electronic device 102 may include, but are not limited to, a computing device, a smartphone, a cellular phone, a mobile phone, a gaming device, a mainframe machine, a server, a computer workstation, and/or a consumer electronic (CE) device.

The server 104 may include suitable logic, circuitry, and interfaces, and/or code that may be configured to retrieve user posts and metadata associated with the user posts from online portals (for example, social media platforms). The server 104 may be configured to store the retrieved user posts and metadata as the set of user posts 112 and the metadata 114, respectively, on the database 108. The server 104 may receive the final category associated with the set of user posts 112 from the electronic device 102. Based on the received final category associated with the set of user posts 112, the server 104 may filter the set of user posts 112 and store the filtered user posts on the database 108. Further, the server 104 may send a request to the online portals (for example, the social media platforms) to delete certain user posts or suspend accounts associated with the particular user posts, based on the filtering of the user posts 112. The server 104 may be implemented as a cloud server and may execute operations through web applications, cloud applications, HTTP requests, repository operations, file transfer, and the like. Other example implementations of the server 104 may include, but are not limited to, a database server, a file server, a web server, a media server, an application server, a mainframe server, or a cloud computing server.

In at least one embodiment, the server 104 may be implemented as a plurality of distributed cloud-based resources by use of several technologies that may be well known to those ordinarily skilled in the art. A person with ordinary skill in the art will understand that the scope of the disclosure may not be limited to the implementation of the server 104 and the electronic device 102 as two separate entities. In certain embodiments, the functionalities of the server 104 can be incorporated in its entirety or at least partially in the electronic device 102, without a departure from the scope of the disclosure.

The user-end device 106 may include suitable logic, circuitry, interfaces, and/or code that may be configured to generate or receive a user post associated with an online portal (such as, a social media platform). Further, the user-end device 106 may be used to provide reactions (such as, likes and re-posting) associated with the user posts on the online portal. For example, the user-end device 106 may include a web-client software/application associated with the online portal, through which the user-end device 106 may generate or receive the user posts and/or provide reactions associated with the user posts. In some embodiments, the user-end device 106 may receive a request from the user 122 to filter user posts associated with the online portal. The user-end device 106 may further send the request to the electronic device 102 and initiate the ethics-based multi-modal user post monitoring by the electronic device 102. Examples of the user-end device 106 may include, but are not limited to, a mobile device, a desktop computer, a laptop, a computer workstation, a computing device, a mainframe machine, a server, such as a cloud server, and a group of servers. Although in FIG. 1, the user-end device 106 is separated from the electronic device 102; however, in some embodiments, the user-end device 106 may be integrated in the electronic device 102, without a deviation from the scope of the disclosure.

The database 108 may include suitable logic, interfaces, and/or code that may be configured to store the set of user posts 112 and the metadata 114 associated with the set of user posts 112. The set of user posts 112 may correspond to at least one of a social media post, news content, or a user comment on a topic, associated with a user. The metadata 114 may correspond to at least one of a user like received from another user on a user post of the received set of user posts 112, a user reaction received from another user on the user post, a sharing of the user post by another user, or a broadcast of the user post by another user. The database 108 may be derived from data off a relational or non-relational database, or a set of comma-separated values (csv) files in conventional or big-data storage. The database 108 may be stored or cached on a device, such as a server or the electronic device 102. The device storing the database 108 may be configured to receive a query for a user post (e.g., the first user post 112A) or metadata (e.g., the first metadata 114A) associated with the user post. In response, the device of the database 108 may be configured to retrieve and provide the queried user post (e.g., the first user post 112A) and the corresponding metadata (e.g., the first metadata 114A). In some embodiments, the database 108 may be hosted on a plurality of servers stored at same or different locations. The operations of the database 108 may be executed using hardware including a processor, a microprocessor (e.g., to perform or control performance of one or more operations), a field-programmable gate array (FPGA), or an application-specific integrated circuit (ASIC). In some other instances, the database 108 may be implemented using software.

The communication network 110 may include a communication medium through which the electronic device 102, the server 104, the user-end device 106, and the device hosting the database 108 may communicate with each other. The communication network 110 may be one of a wired connection or a wireless connection. Examples of the communication network 110 may include, but are not limited to, the Internet, a cloud network, Cellular or Wireless Mobile Network (such as Long-Term Evolution and 5G New Radio), a satellite network (such as, a network of one or more low-earth orbit satellites) a Wireless Fidelity (Wi-Fi) network, a Personal Area Network (PAN), a Local Area Network (LAN), or a Metropolitan Area Network (MAN). Various devices in the environment 100 may be configured to connect to the communication network 110 in accordance with various wired and wireless communication protocols. Examples of such wired and wireless communication protocols may include, but are not limited to, at least one of a Transmission Control Protocol and Internet Protocol (TCP/IP), User Datagram Protocol (UDP), Hypertext Transfer Protocol (HTTP), File Transfer Protocol (FTP), Zig Bee, EDGE, IEEE 802.11, light fidelity (Li-Fi), 802.16, IEEE 802.11s, IEEE 802.11g, multi-hop communication, wireless access point (AP), device to device communication, cellular communication protocols, and Bluetooth (BT) communication protocols.

The logistic model 116 may include suitable logic, circuitry, interfaces, and/or code that may be a regression model, which may be trained to fit on the metadata 114. The regression model may correspond to a parameterized logistic function including a set of parameters such as, but not limited to, a first parameter, a second parameter, or a third parameter. The first parameter may indicate a number of times an initial like or share of a user post, of the set of user posts 112, has to grow to reach a predefined number. The second parameter may correspond to a behavior of an output of the parameterized logistic function. The third parameter may correspond to the predefined number and may indicate a limiting value associated with the growth of the number of likes or shares of the user post. In an embodiment, the set of parameters may correspond to a genetic-based statistical model.

In an embodiment, the logistic model 116 may be stored on the electronic device 102 and executed by the electronic device 102. Alternatively, the logistic model 116 may be stored on the database 108 and may be retrieved from the database 108, via the server 104, by the electronic device 102. The retrieved logistic model 116 may be executed by the electronic device 102. In an embodiment, the operations of the logistic model 116 may be executed using hardware including a processor, a microprocessor (e.g., to perform or control performance of one or more operations), a field-programmable gate array (FPGA), or an application-specific integrated circuit (ASIC). In some other instances, the logistic model 116 may be implemented using software.

The clustering model 118 may include suitable logic, circuitry, interfaces, and/or code that may be an unsupervised clustering model, which may be trained to cluster the set of user posts 112 associated with the metadata 114 fitted to the parameterized logistic function. In an example, the clustering model 118 may correspond to a k-means clustering model. In such case, the clustering of the set of user posts 112 may be based on an application of a k-means clustering technique on each user post of the received set of user posts 112 fitted on the parameterized logistic function. In an example, the value of the hyper-parameter "k" may be determined heuristically. In another example, the value of the hyper-parameter "k" may be determined by use of techniques, such as, but not limited to, an elbow curve method or a silhouette method.

In an embodiment, the clustering model 118 may be stored on the electronic device 102 and executed by the electronic device 102. Alternatively, the clustering model 118 may be stored on the database 108 and may be retrieved from the database 108, via the server 104, by the electronic device 102. The retrieved clustering model 118 may be executed by the electronic device 102. In an embodiment, the operations of the clustering model 118 may be executed using hardware including a processor, a microprocessor (e.g., to perform or control performance of one or more operations), a field-programmable gate array (FPGA), or an application-specific integrated circuit (ASIC). In some other instances, the clustering model 118 may be implemented using software.

The set of feature detection models 120 may include suitable logic, circuitry, interfaces, and/or code that may be configured to determine the set of multi-modal features associated with each of the set of user posts 112. In an embodiment, the set of feature detection models 120 may correspond to one or more natural language models (such as, linguistic models) and/or one or more knowledge bases (such as, world knowledge-based models). Examples of the set of multi-modal features may include, but are not limited to, a term-frequency value of textual content of a user post of the received set of user posts 112, an inverse document frequency value of the textual content of the user post, or a lexicon-based feature of the textual content. The examples of the set of multi-modal features may further include a set of slur or profanity words associated with the textual content, a set of parts-of-speech (POS) bigrams associated with the textual content, a set of topic-specific unigrams or bigrams associated with the textual content, or a set of features associated with application of transformer models on the textual content. The examples of the set of multi-modal features may further include a set of image features associated with the user post, a set of features corresponding to a histogram of image gradients of an image with the user post, a set of audio features associated with the user post, or a set of image frame features and corresponding audio frame features of a video associated with the user post.

In an embodiment, set of feature detection models 120 may be stored on the electronic device 102 and executed by the electronic device 102. Alternatively, the set of feature detection models 120 may be stored on the database 108 and may be retrieved from the database 108, via the server 104, by the electronic device 102. The retrieved set of feature detection models 120 may be executed by the electronic device 102. In an embodiment, the operations of the set of feature detection models 120 may be executed using hardware including a processor, a microprocessor (e.g., to perform or control performance of one or more operations), a field-programmable gate array (FPGA), or an application-specific integrated circuit (ASIC). In some other instances, the set of set of feature detection models 120 may be implemented using software.

In operation, the electronic device 102 may be configured to receive a query (based on a user input from the user 122) from the user-end device 106 for retrieving and filtering of the set of user posts 112. Based on the received query, the electronic device 102 retrieve the set of user posts 112 and the metadata 114 associated with the requested set of user posts 112 from the database 108, via the server 104. For example, the server 104 may retrieve the set of user posts 112 and the corresponding metadata 114 from online portals (such as, social media platforms). The server 104 may store the retrieved set of user posts 112 and the corresponding metadata 114 in the database 108. The electronic device 102 may request for the set of user posts 112 and the corresponding metadata 114 from the database 108, via the server 104, based on the query received from the user-end device 106. The receipt of the set of user posts 112 and the corresponding metadata 114 is described further, for example, in FIG. 3 (at 302 and 304, respectively).

The electronic device 102 may be configured to fit a parameterized logistic function on the metadata 114 associated with the received set of user posts 112. The electronic device 102 may use the logistic model 116 to fit the parameterized logistic function on the metadata 114. The electronic device 102 may be further configured to cluster each of the received set of user posts 112 associated with corresponding metadata 114, based on the fitted parameterized logistic function. The electronic device 102 may use the clustering model 118 to cluster each of the received set of user posts 112. Further, the electronic device 102 may be configured to determine a category-prior associated with each of the received set of user posts 112, based on the clustered set of user posts 112. The determination of the category-prior is described further, for example, in FIG. 3 (at 306 and 308).

The electronic device 102 may be configured to determine a set of multi-modal features associated with each of the received set of user posts 112. The electronic device 102 may determine the set of multi-modal features based on an application of the set of feature detection models 120 on each of the received set of user posts 112. The electronic device 102 may be further configured to determine a feature likelihood for each of the received set of user posts 112, based on the determined set of multi-modal features. The determination of the set of multi-modal features and the determination of the feature likelihood are described further, for example, in FIG. 3 (at 310 and 312).

The electronic device 102 may be configured to determine a final category associated with each of the received set of user posts 112, based on the determined category-prior and on the determined feature likelihood. The electronic device 102 may be further configured to render post categorization information based on the determined final category associated with each of the received set of user posts 112. The post categorization information may be determined from the determined final category of each of the received set of user posts 112. For example, the post configuration information may be rendered on a display device of the electronic device 102 or a display device of the user-end device 106. The received set of user posts 112 may be filtered based on the determined final category. In an embodiment, the electronic device 102 may be configured to receive, based on the post categorization information, a user input indicative at least one of a removal of a user post of the received set of user posts 112 or a suspension of a user account corresponding to the user post. The received set of user posts 112 may be filtered based on the received user input. The determination of the final category is described further, for example, in FIG. 3 (at 314). The rendering of the post category information and the filtering of the received set of user posts 112 are described further, for example, in FIG. 3 (at 316).

Modifications, additions, or omissions may be made to FIG. 1 without departing from the scope of the present disclosure. For example, the environment 100 may include more or fewer elements than those illustrated and described in the present disclosure. For instance, in some embodiments, the environment 100 may include the electronic device 102 but not the database 108. In addition, in some embodiments, the functionality of each of the database 108 and the server 104 may be incorporated into the electronic device 102, without a deviation from the scope of the disclosure.

Figure 2:
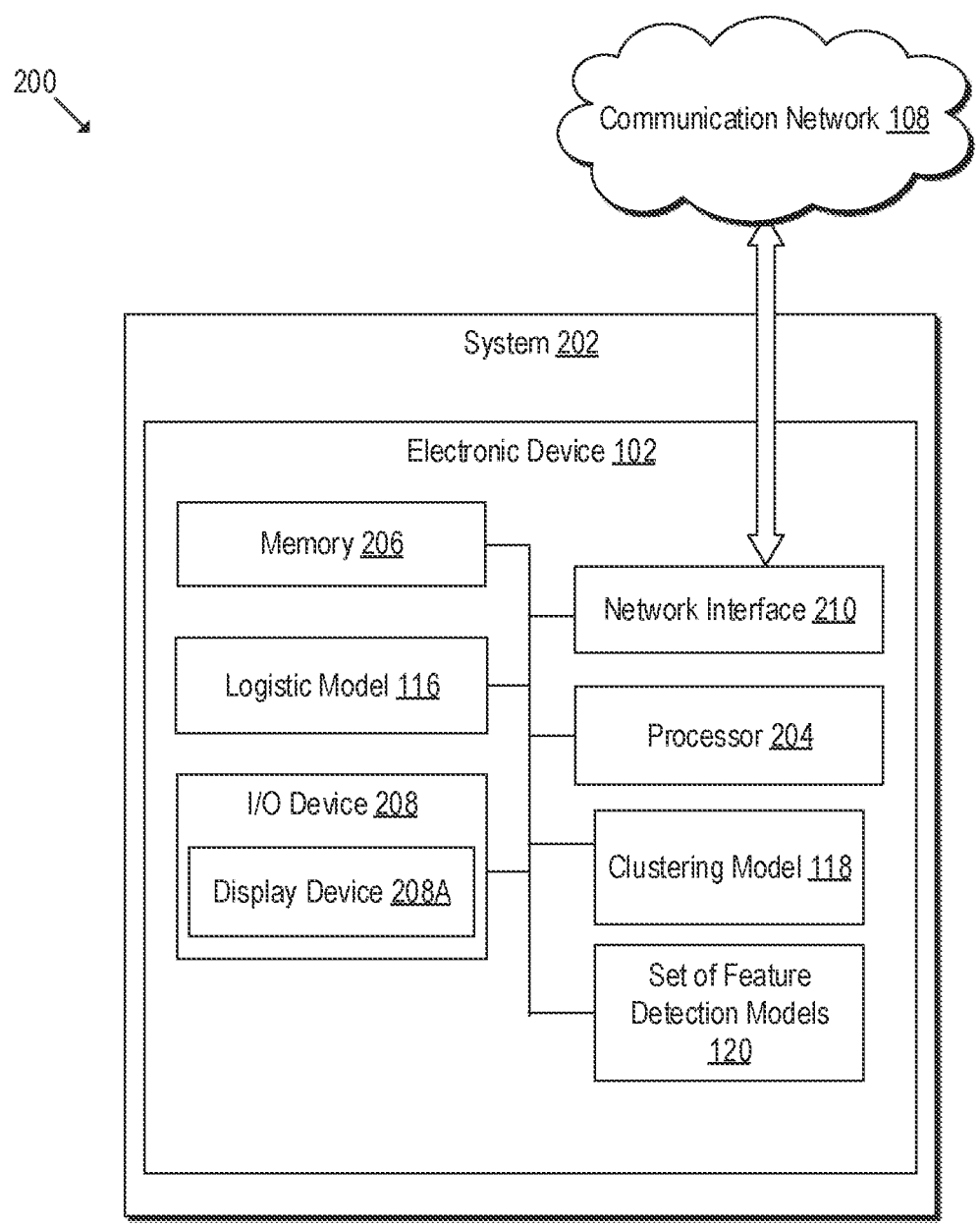
FIG. 2 is a block diagram that illustrates an exemplary electronic device for ethics-based multi-modal user post monitoring.

FIG. 2 is a block diagram that illustrates an exemplary electronic device for ethics-based multi-modal user post monitoring, in accordance with at least one embodiment described in the present disclosure. FIG. 2 is explained in conjunction with elements from FIG. 1. With reference to FIG. 2, there is shown a block diagram 200 of a system 202 including the electronic device 102. The electronic device 102 may include a processor 204, a memory 206, an input/output (I/O) device 208 (including a display device 208A), and a network interface 210. The electronic device 102 may further include the logistic model 116, the clustering model 118, and the set of feature detection models 120.

The processor 204 may include suitable logic, circuitry, and interfaces that may be configured to execute a set of instructions stored in the memory 206. The processor 204 may be configured to execute program instructions associated with different operations to be executed by the electronic device 102. For example, some of the operations may include the reception of the set of user posts 112 and the metadata 114, fitting a parameterized logistic function, clustering each of the received set of user posts 112, and determining the category-prior. The operations may further include determining the set of multi-modal features, determining the feature likelihood, determining the final category, and rendering the post categorization information. The processor 204 may be implemented based on a number of processor technologies known in the art. Examples of the processor technologies may include, but are not limited to, a Central Processing Unit (CPU), X86-based processor, a Reduced Instruction Set Computing (RISC) processor, an Application-Specific Integrated Circuit (ASIC) processor, a Complex Instruction Set Computing (CISC) processor, a Graphical Processing Unit (GPU), a co-processor, or a combination thereof.

Although illustrated as a single processor in FIG. 2, the processor 204 may include any number of processors configured to, individually or collectively, perform or direct performance of any number of operations of the electronic device 102, as described in the present disclosure. Additionally, one or more of the processors may be present on one or more different electronic devices, such as different servers. In some embodiments, the processor 204 may be configured to interpret and/or execute program instructions and/or process data stored in the memory 206. After the program instructions are loaded into the memory 206, the processor 204 may execute the program instructions.

The memory 206 may include suitable logic, circuitry, and interfaces that may be configured to store the one or more instructions to be executed by the processor 204. The one or more instructions stored in the memory 206 may be executed by the processor 204 to perform the different operations of the processor 204 (and the electronic device 102). The memory 206 that may be configured to store the logistic model 116, the clustering model 118, and the set of feature detection models 120. The memory 206 may further store the received set of user posts 112, the received metadata 114, the determined category-prior, the determined feature likelihood, the determined final category, and the post categorization information. Examples of implementation of the memory 206 may include, but are not limited to, Random Access Memory (RAM), Read Only Memory (ROM), Electrically Erasable Programmable Read-Only Memory (EEPROM), Hard Disk Drive (HDD), a Solid-State Drive (SSD), a CPU cache, and/or a Secure Digital (SD) card.

The I/O device 208 may include suitable logic, circuitry, and interfaces that may be configured to receive an input from the user 122 and provide an output based on the received input. For example, the I/O device 208 may receive the set of user posts 112 and/or the metadata 114, based on a user input from the user 122. Further, the I/O device 208 may receive another user input indicative of a user request to filter the set of user posts 112 based on ethics-based multi-modal user post monitoring. The I/O device 208 may render the post categorization information as an output for the user 122. The I/O device 208 which may include various input and output devices, may be configured to communicate with the processor 204. Examples of the I/O device 208 may include, but are not limited to, a touch screen, a keyboard, a mouse, a joystick, a microphone, a display device (e.g., the display device 208A), and a speaker.

The display device 208A may include suitable logic, circuitry, and interfaces that may be configured to display the post categorization information. The display device 208A may be a touch screen which may enable a user to provide a user-input via the display device 208A. The touch screen may be at least one of a resistive touch screen, a capacitive touch screen, or a thermal touch screen. The display device 208A may be realized through several known technologies such as, but not limited to, at least one of a Liquid Crystal Display (LCD) display, a Light Emitting Diode (LED) display, a plasma display, or an Organic LED (OLED) display technology, or other display devices. In accordance with an embodiment, the display device 208A may refer to a display screen of a head mounted device (HMD), a smart-glass device, a see-through display, a projection-based display, an electro-chromic display, or a transparent display.

The network interface 210 may include suitable logic, circuitry, and interfaces that may be configured to facilitate communication between the processor 204 and a device hosting the database 108 (and/or any other device in the environment 100), via the communication network 110. The network interface 210 may be implemented by use of various known technologies to support wired or wireless communication of the electronic device 102 with the communication network 110. The network interface 210 may include, but is not limited to, an antenna, a radio frequency (RF) transceiver, one or more amplifiers, a tuner, one or more oscillators, a digital signal processor, a coder-decoder (CODEC) chipset, a subscriber identity module (SIM) card, or a local buffer circuitry. The network interface 210 may be configured to communicate via wireless communication with networks, such as the Internet, an Intranet, or a wireless network, such as a cellular telephone network, a wireless local area network (LAN), and a metropolitan area network (MAN). The wireless communication may be configured to use one or more of a plurality of communication standards, protocols and technologies, such as Global System for Mobile Communications (GSM), Enhanced Data GSM Environment (EDGE), wideband code division multiple access (W-CDMA), Long Term Evolution (LTE), 5th Generation (5G) New Radio (NR), code division multiple access (CDMA), time division multiple access (TDMA), Bluetooth, Wireless Fidelity (Wi-Fi) (such as IEEE 802.11a, IEEE 802.11b, IEEE 802.11g or IEEE 802.11n), voice over Internet Protocol (VoIP), light fidelity (Li-Fi), Worldwide Interoperability for Microwave Access (Wi-MAX), a protocol for email, instant messaging, and a Short Message Service (SMS).

Modifications, additions, or omissions may be made to the example electronic device 102 without departing from the scope of the present disclosure. For example, in some embodiments, the example electronic device 102 may include any number of other components that may not be explicitly illustrated or described for the sake of brevity.

Figure 3:
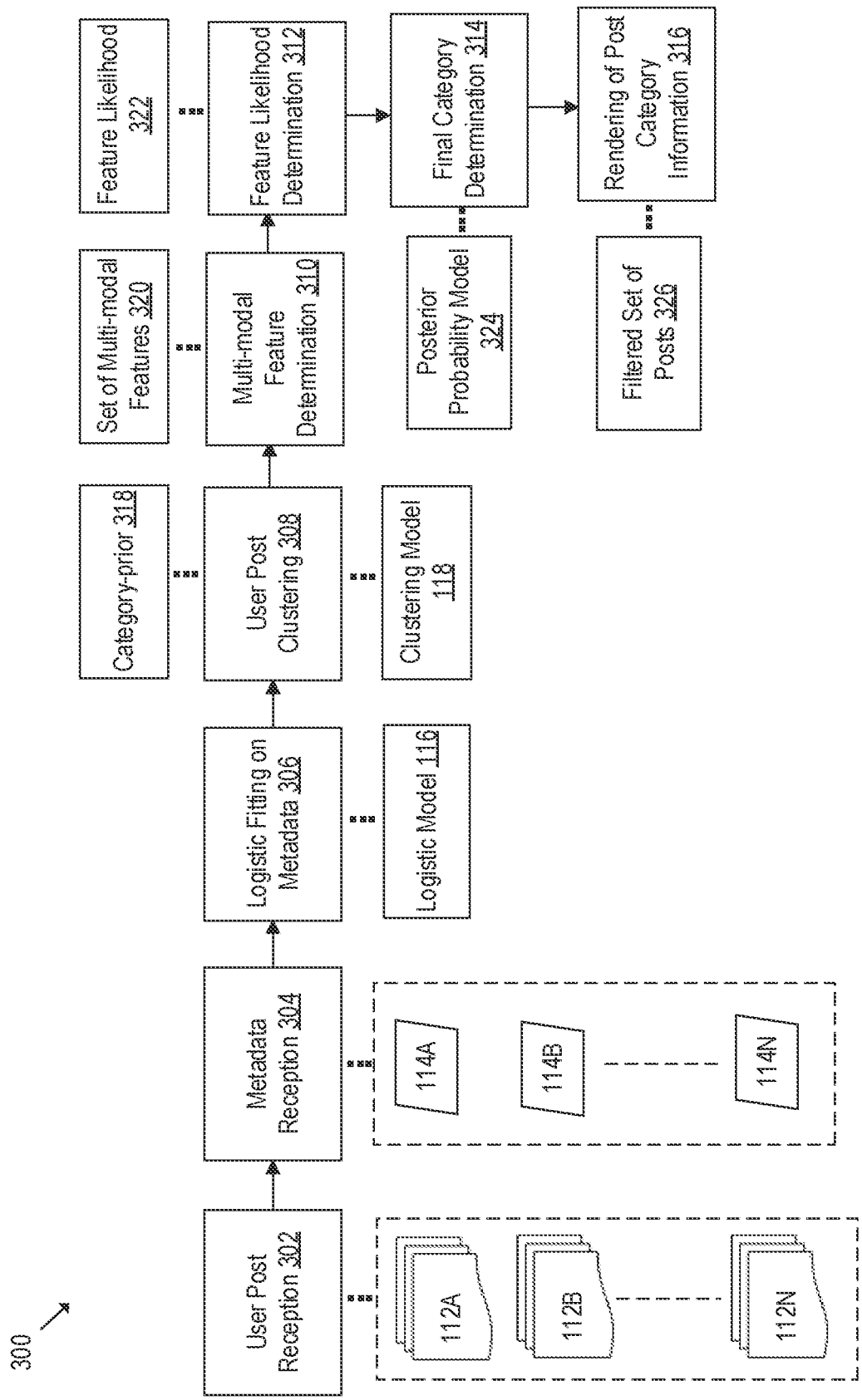
FIG. 3 is a diagram that illustrates an execution pipeline for ethics-based multi-modal user post monitoring.

FIG. 3 is a diagram that illustrates an execution pipeline for ethics-based multi-modal user post monitoring, in accordance with an embodiment of the disclosure. FIG. 3 is described in conjunction with elements from FIG. 1 and FIG. 2. With reference to FIG. 3, there is shown an execution pipeline 300. The exemplary execution pipeline 300 may include a set of operations that may be executed by one or more components of FIG. 1, such as, the electronic device 102. The set of operations may include an operation 302 for user post reception, an operation 304 for metadata reception, an operation 306 for logistic fitting on metadata, an operation 308 for clustering of user posts, an operation 310 for multi-modal feature determination, an operation 312 for feature likelihood determination, an operation 314 for final category determination, and an operation 316 for rendering of post categorization information. The set of operations may be performed by the electronic device 102 for ethics-based multi-modal user post monitoring, as described herein.

At 302, the operation for user post reception may be executed. In an embodiment, the processor 204 may be configured to receive the set of user posts 112 from the database 108, via the server 104. The processor 204 may receive a user input indicative of query for retrieving and filtering of the set of user posts 112. Based on the received user input, the processor 204 may send a request corresponding to the query to the database 108. Based on the query, the database 108 may retrieve the set of user posts 112 stored on the database 108 and send the retrieved set of user posts 112 to the electronic device 102. The processor 204 may receive the set of user posts 112 from the database 108 and store the received set of user posts 112 in the memory 206. In another scenario, the set of user posts 112 may be already pre-stored in the memory 206 of the electronic device 102. In such case, the processor 204 may extract the set of user posts 112 from the memory 206, based on the received user input. In an embodiment, the received set of user posts 112 may correspond to at least one of, but not limited to, a social media post, news content, or a user comment on a topic, associated with a user.

At 304, the operation for metadata reception may be executed. In an embodiment, the processor 204 may be configured to receive the metadata 114 associated with the received set of user posts 112 from the database 108, via the server 104. In an embodiment, the user input indicative of the query for retrieving and filtering of the set of user posts 112 may also include another query for retrieving the metadata 114 associated with the set of user posts 112. Based on the received user input, the processor 204 may send a request corresponding to the queries to the database 108. Based on the queries, the database 108 may retrieve metadata 114 associated with the set of user posts 112 stored on the database 108 and send the retrieved metadata 114 to the electronic device 102. The processor 204 may receive the metadata 114 from the database 108 and store the received metadata 114 in the memory 206. In another scenario, the metadata 114 may be already pre-stored in the memory 206 of the electronic device 102. In such case, the processor 204 may extract the metadata 114 from the memory 206, based on the received user input. The metadata 114 associated with the received set of user posts 112 may correspond to at least one of, but not limited to, a user-like received from another user on a user post of the received set of user posts 112, a user reaction received from the other user on the user post, a sharing of the user post by the other user, or a broadcast of the user post by the other user.

At 306, the operations for logistic fitting on metadata may be executed. In an embodiment, the processor 204 may be configured to fit a parameterized logistic function on the metadata 114 associated with the received set of user posts 112. For example, the processor 204 may apply the logistic model 116 on the metadata 114 to fit a parameterized logistic function associated with the logistic model 116 on the metadata 114. a parameterized logistic function including a set of parameters such as, but not limited to, a first parameter (e.g., a parameter "A"), a second parameter (e.g., a parameter "B"), or a third parameter (e.g., a parameter "C"). The first parameter (i.e., the parameter "A") may indicate a number of times an initial like or share of a user post, of the set of user posts 112, has to grow to reach a predefined number (i.e., the parameter "C"). The second parameter (i.e., the parameter "B") may correspond to a behavior of an output of the parameterized logistic function. The third parameter (i.e., the parameter "C") may correspond to the predefined number and may indicate a limiting value associated with the growth of the number of likes or shares of the user post. In an embodiment, the set of parameters may correspond to a genetic-based statistical model. The set of parameters (i.e., the parameters "A", "B", and "C") may characterize each of the received set of user posts 112. In an example, the parameterized logistic function corresponding to the logistic model 116 may be represented by the following equation (1):

$$y = \frac{C}{(1 + A \cdot \exp(-B \cdot t))} \quad (1)$$

where,
- "y" may represent the logistic model 116;
- "A" may represent the first parameter;
- "B" may represent the second parameter;
- "C" may represent the third parameter;
- "exp( )" may represent an exponent function; and
- "t" may represent a time since an upload of a user post on an online portal.

In an embodiment, the logistic model 116 may be used to simulate growth of user likes to user posts and other metadata associated with the set of user posts 112. The simulation of growth of user likes to user posts may be useful to determine a category associated with the user posts. For example, user posts that have rapidly growing likes (e.g., virally growing, or propagating user posts) may include defamatory content, hateful content, or may be related to controversies or trending topics. An example of the fitting of the parameterized logistic function is described further, for example, in FIG. 4.

At 308, the operation for clustering of user posts may be executed. In an embodiment, the processor 204 may be configured to cluster each of the received set of user posts 112 associated with corresponding metadata 114, based on the fitted parameterized logistic function. The processor 204 may apply the clustering model 118 on the received set of user posts 112, based on the fitted parameterized logistic function, to cluster each of the received set of user posts 112. In an embodiment, the clustering may be based on an application of a k-means clustering technique on each user post of the received set of user posts 112 fitted on the parameterized logistic function. In an example, the clustering model 118 may correspond to a k-means clustering model. The value of "k" may be determined heuristically. In an example, the value of "k" may be determined based on techniques such as, an elbow curve method or a silhouette method.

In an embodiment, ground truth or true labels associated with user posts may not be available. For example, human categorized labels associated with user posts may not be available for the user posts, which may be large in number. The clustering model 118 may use "x=[A B C]" as a vector of inputs to cluster the received set of user posts 112, where "x" may represent the vector of inputs, and "A", "B", and "C" may represent the set of parameters of the parameterized logistic function. Based on the vector of inputs (i.e., "x") for the individual user posts, the clustering model 118 may partition a two-dimensional observation space by use of k-means technique. The clustering process may be iterated multiple times as and when more user likes to a user post accumulate, as described herein.

For example, consider that "$c_{ti}$" denotes an "$i^{th}$" cluster at a time step "t", "mt," denotes a centroid of the "$i^{th}$" cluster at the time step "t", and "$x_p$" denotes the observation vector (i.e., "x") of the logistic parameters. In each iteration, each observation (i.e., a user post) may be assigned to the closest centroid of the observation, by use of the following equation (2):

$$c_{ti} = \|X_P - m_{ti}\| \leq \|X_P - m_{tj}\| \tag{2}$$

where,
- "$c_{ti}$" may represent the "$j^{th}$" cluster at a time step "t";
- "$x_p$" may represent the "$p^{th}$" observation (i.e., a user post);
- "$m_{ti}$" may represent a centroid of the "$i^{th}$" cluster at the time step "t";
- "$m_{tj}$" may represent a centroid of the "$j^{th}$" cluster at the time step "t"; and "Hi" may represent a distance metric (e.g., a first norm).

Based on the equation (2), an observation may be clustered in the "$j^{th}$" cluster if a distance of the vector associated with the observation from the centroid of the "$j^{th}$" cluster is less than a distance of the vector associated with the observation from the centroid of the "$j^{th}$" cluster. At each time step "t", after an iteration of the clustering of each observation in a certain cluster, the clustering model 118 may update the centroids associated with each cluster. For example, the clustering model 118 may use the following equation (3) to update the centroid associated with each cluster:

$$m_{i(t+1)} = \frac{1}{|c_{ti}|} \sum x_j \tag{3}$$

where,
- "$c_{ti}$" may represent the "$i^{th}$" cluster at a time step "t";
- "$x_j$" may represent the "$j^{th}$" observation (i.e., a user post) associated with the cluster "$c_{ti}$";
- "$m_{i(t+1)}$" may represent a centroid of the "$i^{th}$" cluster at the time step "(t+1)"; and
- "|.|" may represent modulus operator.

In an embodiment, the processor 204 may be configured to determine a category-prior (e.g., a category-prior 318) associated with each of the received set of user posts 112, based on the clustered set of user posts. In an embodiment, the determination of the category-prior 318 associated with a user post of the received set of user posts 112 may be based on a normalized distance between a vector representation of the user post and a corresponding cluster centroid. For example, based on the clustering, the processor 204 may be configured to determine a probability with which a certain user post may belong to a first cluster (e.g., hateful content) or a second cluster (e.g., non-hate content). The determined probability may correspond to the category-prior 318 and may be computed by the processor 204 by use of the following equation (4):

$$P_{ci} = \frac{z}{d_{vi}} \tag{4}$$

where,
- "$P_{ci}$" may represent a probability that a user post belongs to an $i^{th}$ cluster;
- "z" may represent a proportionality constant; and
- "$d_{vi}$" may represent a normalized Euclidean distance between an observation vector (i.e.,
- "$x_p$" associated with a user post, such as, a $p^{th}$ user post) and a corresponding cluster centroid (i.e., a centroid of the $j^{th}$ cluster).

For example, if the $i^{th}$ cluster corresponds to a hate content cluster, then $P_{ci}$ may be a probability that a certain user post corresponds to hateful content. The category-prior 318 associated with the user post being the hateful content may correspond to the probability $P_{ci}$.

At 310, the operation for multi-modal feature determination may be executed. In an embodiment, the processor 204 may be configured to determine a set of multi-modal features (e.g., a set of multi-modal features 320) associated with each of the received set of user posts 112. The processor 204 may apply the set of feature detection models 120 on each of the received set of user posts 112 to determine the set of multi-modal features 320. In an embodiment, the set of feature detection models 120 may correspond to one or more natural language models (such as, linguistic models) and/or one or more knowledge bases (such as, world knowledge-based models). Examples of the set of multi-modal features 320 may include, but are not limited to, a term-frequency value of textual content of a user post of the received set of user posts 112, an inverse document frequency value of the textual content of the user post, or a lexicon-based feature of the textual content. The examples of the set of multi-modal features 320 may further include a set of slur or profanity words associated with the textual content, a set of parts-of-speech (POS) bigrams associated with the textual content, a set of topic-specific unigrams or bigrams associated with the textual content, or a set of features associated with application of transformer models on the textual content. The examples of the set of multi-modal features 320 may further include a set of image features associated with the user post, a set of features corresponding to a histogram of image gradients of an image with the user post, a set of audio features associated with the user post, or a set of image frame features and corresponding audio frame features of a video associated with the user post.

For example, the set of multi-modal features 320 may correspond to ethics-related features, such as, whether a user post is biased against at least one of, but not limited to, a minority community, a race, a color, a gender, an age group, a culture, a sexual orientation, an intelligence, a physical disability, a political opinion, or a religious opinion. Based on the application of the set of feature detection models 120 on each of the received set of user posts 112, the processor 204 may determine the set of multi-modal features 320. For example, the processor 204 may use a natural language processing model to determine textual features in a user post to analyze whether the user post includes discriminatory or defamatory content directed towards a certain type of community, race, color, gender, age group, and the like. Similarly, the processor 204 may use an image analysis model (and/or a neural network model, such as, a convolution neural network) to determine image features in a user post to analyze whether the user post includes an image, which may be insulting or biased towards people of a culture, a gender, an age group, or a physical disability.

At 312, the operation for feature likelihood determination may be executed. In an embodiment, the processor 204 may be configured to determine a feature likelihood (e.g., a feature likelihood 322) for each of the received set of user posts 112, based on the determined set of multi-modal features 320. In an embodiment, the determination of the feature likelihood 322 for each user post of the received set of user posts 112 may be based on a normalized distance between a vector representation of the user post and a corresponding category associated with a feature from the determined set of multi-modal features 320. For example, the processor 204 may determine the set of multi-modal features 320 associated with a user post (of the received set of user posts 112) based on the application of the set of feature detection models 120. The user post may be represented based on a corresponding vector (e.g., "v") in a multi-dimensional vector space, based on the determined set of multi-modal features 320. Further, each category (e.g., a first category, such as, hateful content category, and a second category, such as, a non-hate content category) may also be represented by an associated vector (e.g., "$c_1$" and "$c_2$", respectively) in the same multi-dimensional vector space. In such case, the processor 204 may determine a first normalized distance (e.g., a distance "$d_1$") between "v" and "$c_1$" (i.e., $d_1 = \|v-c_1\|$, where $\|.\|$ may represent a normalized distance operator, such as, a first norm) for the first category.

Similarly, the processor 204 may determine a second normalized distance (e.g., a distance "$d_2$") between "v" and "$c_2$" (i.e., $d_2 = \|v-c_2\|$) for the second category. The processor 204 may determine the feature likelihood 322 (e.g., $P_l(D_T|C=c_i)$, where "$D_T$" may represent the set of multi-modal features 320 of a "$T^{th}$" user post) of the user post corresponding to a certain class (e.g., hateful content class), based on a normalized distance (e.g., the first normalized distance, i.e., "$d_1$"), which may correspond to the class. In an example, the feature likelihood 322 may be inversely proportional to the normalized distance.

At 314, the operation for final category determination may be executed. In an embodiment, the processor 204 may be configured to determine a final category associated with each of the received set of user posts 112, based on the determined category-prior 318 and on the determined feature likelihood 322. In an embodiment, the processor 204 may be configured to determine a posterior probability of the user post corresponding to a category of a set of categories associated with the received set of user posts 112, based on the determined category-prior 318 and on the determined feature likelihood 322. The determination of the posterior probability may correspond to the final category. For example, the posterior probability may correspond to a posterior probability model 324. In an embodiment, the determined posterior probability (e.g., the posterior probability model 324) may correspond to a Bayesian probability model for the categorization of the received set of user posts 112. In an example, the processor 204 may use the following equation (5) to determine the posterior probability, based on a Bayesian probability model framework:

$$P_t(T=c_i|D_t) = \frac{P_l(D_{ct}|C=c_i)P_{c_i}(T=c_i)}{\sum_{i=1}^{k} P_l(D_t|C=c_i)P_{c_i}(T=c_i)} \quad (5)$$

where,
"$P_{c_i}(T=c_i)$" may represent a prior probability (e.g., the category-prior 318) of a user post "T" that may belong to a category "$c_i$" based on metadata such as, likes and shares of the user post "T";
"$P_l(D_t|C=c_i)$" may represent a likelihood determined based on the set of multi-modal features 320 (e.g., the features "$D_t$" associated with the user post "T"); and
"$P_t(T=c_i|D_t)$" may represent a posterior probability (e.g., the posterior probability model 324) that the user post "T" with features "$D_t$" belongs to the category "$c_i$".

Herein, in an example, k=2. Thus, the user post "T" may be categorized in one of two categories, such as, a positive category (e.g., a hateful comment) and a negative category (e.g., a non-hateful or neutral comment).

At 316, an operation for rendering of post category information may be executed. In an embodiment, the processor 204 may be configured to render post categorization information based on the determined final category associated with each of the received set of user posts 112. The post category information may include information related to the final category determined (at 314) for each of the set of user posts 112. For example, the post category information may indicate that the first user post 112A may be a hateful comment, the second user post 112B may be a non-hateful comment, ... and the Nth user post 112N may be a hateful comment. The processor 204 may render the post categorization information on the display device 208A.

In an embodiment, the received set of user posts 112 may be filtered, to obtain a filtered set of posts 326, based on the determined final category. The processor 204 may be configured to receive a user input based on the post categorization information (which may include the determined final category for each of the set of user posts 112). The received user input may be indicative of at least one of a removal of a user post of the received set of user posts 112 or a suspension of a user account corresponding to the user post 112. The received set of user posts may be filtered to obtain the filtered set of posts 326, based on the received user input. For example, the user input may indicate that the first user post 112A that may be a hateful comment is to be removed. In another example, the user input may indicate that a user account associated with the Nth user post 112N (also be a hateful comment) is to be suspended.

Typically, various Artificial Intelligence (AI)/Machine Learning (ML) techniques may be used to analyze large volume of real-time content and perform automated content moderation. However, the use of AI/ML models for content moderation may blur boundaries between public and private communication, and thereby raise privacy concerns. Further, commercial priorities, such as, targeted advertisements, may be served to unaware users without their consent, based on analysis of the content/context of communication between the users. In addition, existing societal biases associated with the content may be increased in case the AI/ML models are not designed and trained properly. For example, an AI/ML model may be trained based on a statistically imbalanced dataset that may favor one section of the society, as compared to a marginalized community. When such AI/ML model is used for content moderation, the AI/ML model may produce results, which may be biased against the marginalized community The electronic device 102, on the other hand, may execute automatic ethics-based multi-modal user post monitoring. The electronic device 102 may fit a parameterized logistic function on the metadata 114 associated with the received set of user posts 112. Further, each of the received set of user posts 112 associated with corresponding metadata 114 may be clustered, based on the fitted parameterized logistic function. The category-prior 318 associated with each of the received set of user posts 112 may be determined, based on the clustered set of user posts. Further, the set of multi-modal features 320 associated with each of the received set of user posts 112 may be determined and the set of multi-modal features 320 may be used to determine the feature likelihood 322 for each of the received set of user posts 112. Thereafter, a final category associated with each of the received set of user posts 112 may be determined, based on the determined category-prior 318 and on the determined feature likelihood 322. Thus, the electronic device 102 may use a two-level authentication for the ethical monitoring of the user posts. For example, a first level may correspond to the determination of the category-prior 318 and a second level may correspond to the determination of the feature likelihood 322 (from the set of multi-modal features 320). The two-level authentication may save a computation time and improve an efficiency of the classification of the set of user posts 112. Further, the two-level authentication may also increase a likelihood that the classification of the set of user posts 112 may be ethical. The disclosed technique may be applicable across social media platforms and may be language agnostic. In addition, as the disclosed technique may correspond to an unsupervised learning technique, labelled data may not be required for the classification of the set of user posts 112.

In an example, the disclosed technique may be used in content recommendation systems to filter abusive or hateful content. As analysis of a large number of user posts may be cumbersome, the disclosed technique may be used to probabilistically determine a category (e.g., hateful content or non-hate content categories) for each user post. The user posts that are categorized as hateful content may be manually reviewed for filtering of such user posts. Further, the disclosed technique may be used for various other scenarios, such as, for prevention of fake news propagation, and/or prevention of cyber-bulling. The disclosed technique may consume lesser computation time for classification of user posts from a social media platform. Also, as the disclosed technique may use the two-step authentication (i.e., a prior probability computation using simple metadata and a posterior probability computation based on a Bayesian framework), the disclosed technique may be more efficient than existing techniques.

Figure 4:
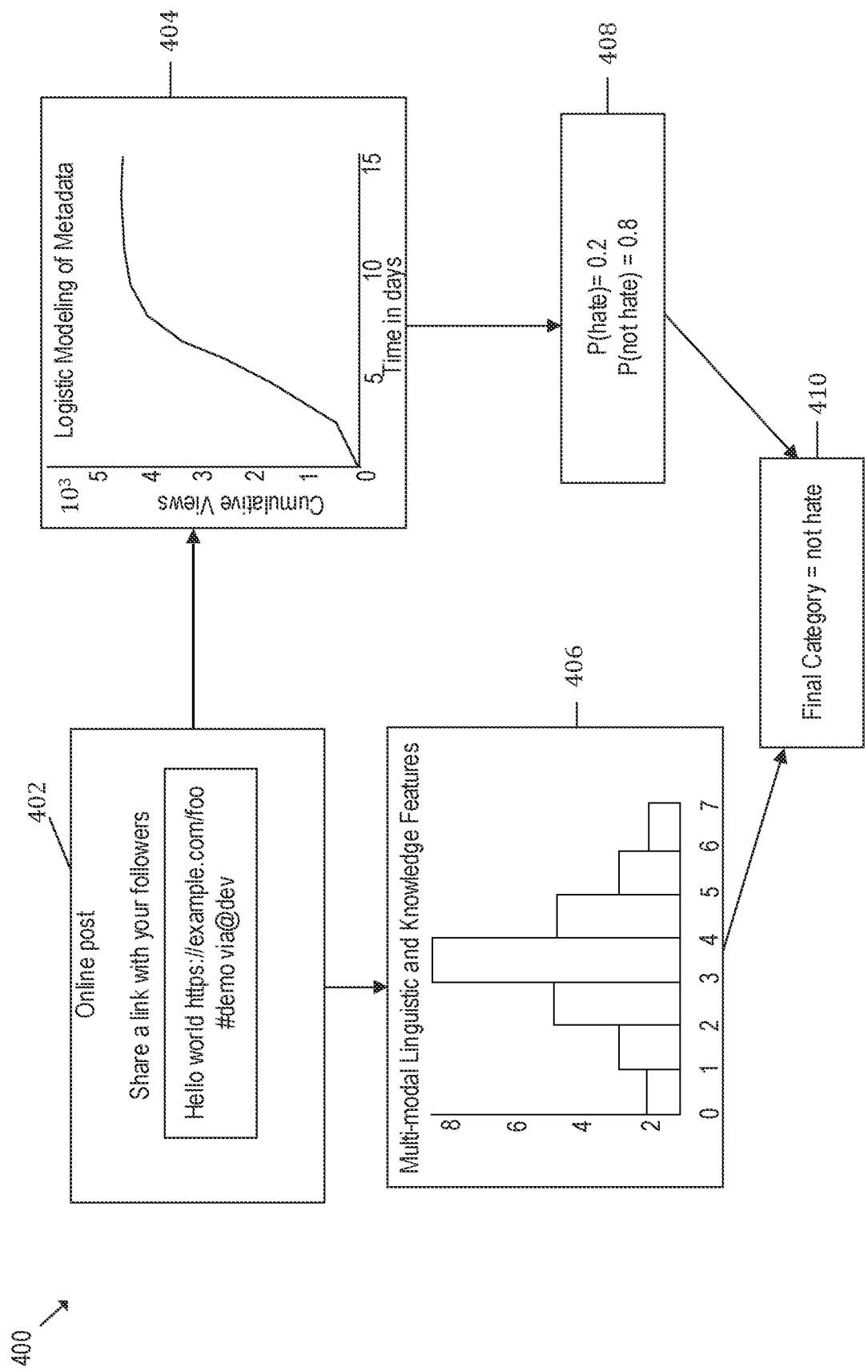
FIG. 4 is a diagram that illustrates an exemplary scenario for ethics-based multi-modal user post monitoring.

FIG. 4 is a diagram that illustrates an exemplary scenario for ethics-based multi-modal user post monitoring, in accordance with an embodiment of the disclosure. FIG. 4 is described in conjunction with elements from FIG. 1, FIG. 2, and FIG. 3. With reference to FIG. 4, there is shown an exemplary scenario 400. The scenario 400 may include an online post 402, a logistic modeling of metadata 404, multi-modal linguistic and knowledge features 406, a category-prior 408, and a final category 410.

For example, the online post 402 may correspond to a user post from the received set of user posts 112. In an example, the online post 402 may include a textual content (such as, "Hello world https://example.com/foo #demo via@dev"). The online post 402 may be uploaded by a user on an online portal, such as, a social media platform. The online post 402 may have associated metadata, such as, a number of likes of the online post 402 on the online portal, a number of views of the online post 402 on the online portal, and a number of shares of the online post 402 on the online portal.

In an embodiment, the processor 204 may apply the logistic model 116 on the metadata associated with the online post 402. For example, the processor 204 may fit a parameterized logistic function on the metadata, based on the logistic modeling of the metadata 404. In an example, the logistic modeling of the metadata 404 may model a cumulative number of views of the online posts 402 on the online portal against time (in days), as the parameterized logistic function. The processor 204 may determine a category-prior associated with the online post 402 based on the logistic modeling of the metadata 404. For example, the processor 204 may determine the category-prior 408, which may indicate that a probability that the online post 402 may belong to a hateful content category may be 0.2 (i.e., P(hate)=0.2). Further, the category-prior 408 may indicate that a probability that the online post 402 may belong to a non-hate content category may be 0.8 (i.e., P(non-hate)=0.8). The determination of the category-prior is described further, for example, in FIG. 3 (at 308).

In an embodiment, the processor 204 may determine a set of multi-modal features associated with the online post 402, based on an application of the set of feature detection models 120 on the online post 402. For example, the determined set of multi-modal features may correspond to multi-modal linguistic and knowledge features 406, shown in FIG. 4. Based on the determined set of multi-modal linguistic and knowledge features 406, the processor 204 may determine a feature likelihood associated with the online post 402. The determination of the feature likelihood is described further, for example, in FIG. 3 (at 312).

In an embodiment, the processor 204 may determine a final category associated with the online post 402, based on the determined category-prior 408 and on the determined feature likelihood. In an example, the processor 204 may use a Bayesian framework to determine the final category, based on a posterior probability model. For example, as shown in FIG. 4, the final category 410 may be determined as "not-hate" category for the online post 402. The determination of the final category is described further, for example, in FIG. 3 (at 314).

It should be noted that the scenario 400 of FIG. 4 is for exemplary purpose and should not be construed to limit the scope of the disclosure.

Figure 5:
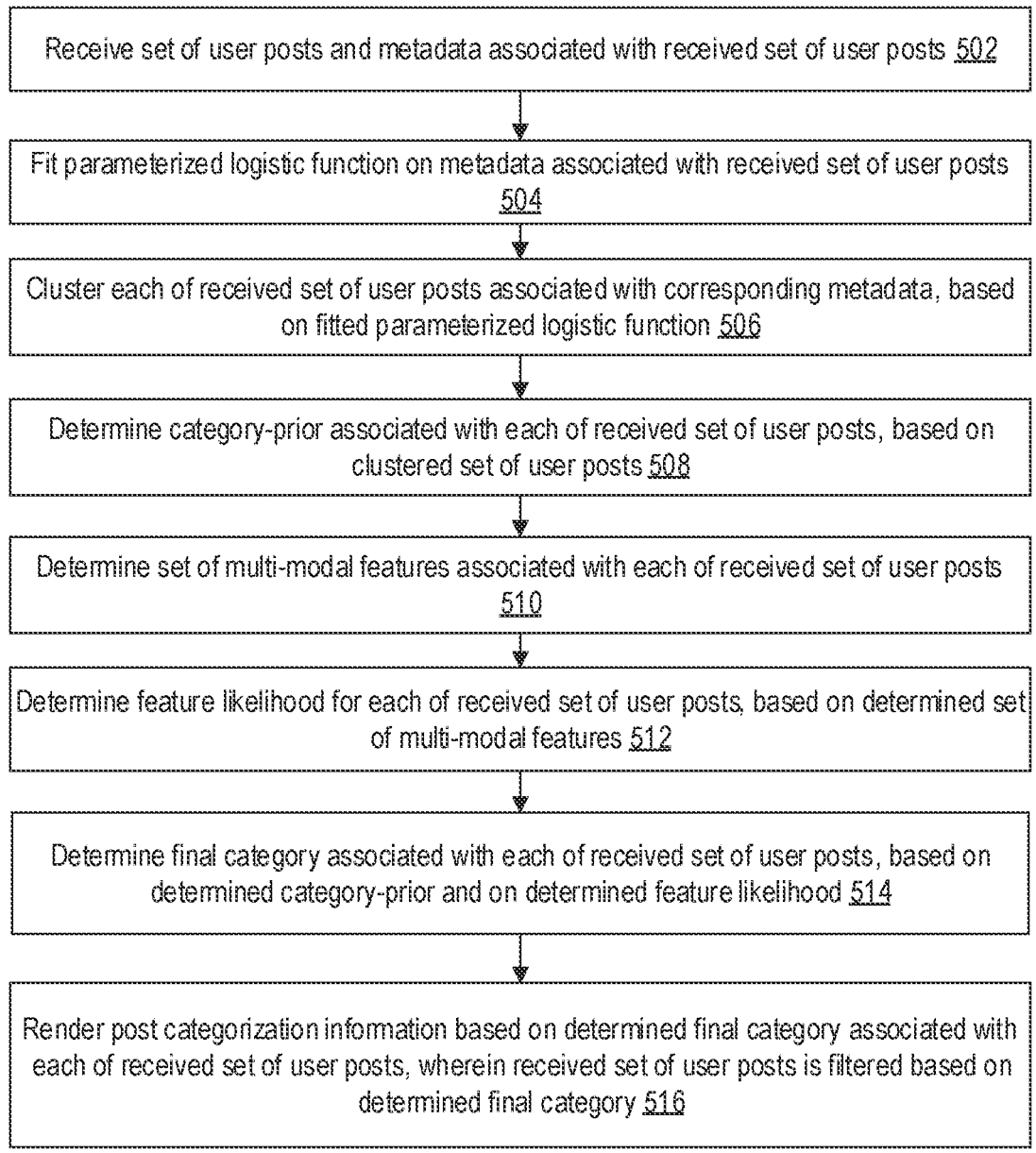
FIG. 5 is a diagram that illustrates a flowchart of an example method for ethics-based multi-modal user post monitoring.

FIG. 5 is a diagram that illustrates a flowchart of an example method for ethics-based multi-modal user post monitoring, in accordance with an embodiment of the disclosure. FIG. 5 is described in conjunction with elements from FIG. 1, FIG. 2, FIG. 3, and FIG. 4. With reference to FIG. 5, there is shown a flowchart 500. The method illustrated in the flowchart 500 may start at 502 and may be performed by any suitable system, apparatus, or device, such as, by the example electronic device 102 of FIG. 1, or the processor 204 of FIG. 2. Although illustrated with discrete blocks, the steps and operations associated with one or more of the blocks of the flowchart 500 may be divided into additional blocks, combined into fewer blocks, or eliminated, depending on the particular implementation.

At block 502, a set of user posts and metadata associated with the set of user posts may be received. In an embodiment, the processor 204 may be configured to receive the set of user posts 112 and the metadata 114 associated with the set of user posts 112. The set of user posts 112 and the metadata 114 may be received from the database 108, via the server 104. The reception of the set of user posts and the metadata is described further, for example, in FIG. 3 (at 302 and 304, respectively).

At block 504, a parameterized logistic function may be fit on the metadata associated with the received set of user posts. In an embodiment, the processor 204 may be configured to fit the parameterized logistic function on the metadata 114 associated with the received set of user posts 112. The parameterized logistic function may be fit by application of the logistic model 116 on the metadata 114. The logistic fitting on the metadata is described further, for example, in FIG. 3 (at 306).

At block 506, each of the received set of user posts associated with corresponding metadata may be clustered, based on the fitted parameterized logistic function. In an embodiment, the processor 204 may be configured to cluster each of the received set of user posts 112 associated with corresponding metadata 114, based on the fitted parameterized logistic function. The received set of user posts 112 may be clustered based on an application of the clustering model 118 on each of the received set of user posts 112. The clustering of the received set of user posts is described further, for example, in FIG. 3 (at 308).

At block 508, a category-prior associated with each of the received set of user posts may be determined, based on the clustered set of user posts. In an embodiment, the processor 204 may be configured to determine the category-prior (e.g., the category-prior 318) associated with each of the received set of user posts, 112 based on the clustered set of user posts. The determination of the category-prior is described further, for example, in FIG. 3 (at 308).

At block 510, a set of multi-modal features associated with each of the received set of user posts may be determined. In an embodiment, the processor 204 may be configured to determine the set of multi-modal features (e.g., the set of multi-modal features 320) associated with each of the received set of user posts 112. The processor 204 may apply the set of feature detection models 120 on each of the received set of user posts 112 to determine the set of multi-modal features 320. For example, the set of multi-modal features may correspond to one or more linguistic features and/or one or more knowledge features. The determination of the set of multi-modal features is described further, for example, in FIG. 3 (at 310).

At block 512, a feature likelihood for each of the received set of user posts may be determined, based on the determined set of multi-modal features. In an embodiment, the processor 204 may be configured to determine the feature likelihood (e.g., the feature likelihood 322) for each of the received set of user posts 112, based on the determined set of multi-modal features 320. The determination of the feature likelihood is described further, for example, in FIG. 3 (at 312).

At block 514, a final category associated with each of the received set of user posts may be determined, based on the determined category-prior and on the determined feature likelihood. In an embodiment, the processor 204 may be configured to determine the final category associated with each of the received set of user posts 112, based on the determined category-prior 318 and on the determined feature likelihood 322. In an embodiment, the processor 204 may determine a posterior probability (e.g., the posterior probability model 324) of a user post corresponding to a category of a set of categories associated with the received set of user posts 112, based on the determined category-prior 318 and on the determined feature likelihood 322. The determination of the posterior probability may correspond to the final category of the user post. In an example, the determined posterior probability may correspond to a Bayesian probability model for the categorization of the received set of user posts 112. The determination of the final category is described further, for example, in FIG. 3 (at 314).

At block 516, post categorization information may be rendered, based on the determined final category associated with each of the received set of user posts. Herein, the received set of user posts 112 may be filtered based on the determined final category. In an embodiment, the processor 204 may be configured to render the post categorization information, based on the determined final category associated with each of the received set of user posts 112. The processor 204 may render the post categorization information, including an indication of the final category of each of the received set of user posts 112, on the display device 208A. The received set of user posts 112 may be filtered based on the determined final category. In an embodiment, the processor 204 may receive a user input based on the rendered post categorization information. The received user input may indicate at least one of a removal of a user post of the received set of user posts 112 or a suspension of a user account corresponding to the user post, based on the final category associated with the user post. The received set of user posts 112 may be filtered based on the received user input. The rendering of the post categorization information is described further, for example, in FIG. 3 (at 316). Control may pass to end.

Although the flowchart 500 is illustrated as discrete operations, such as 502, 504, 506, 508, 510, 512, 514, and 516. However, in certain embodiments, such discrete operations may be further divided into additional operations, combined into fewer operations, or eliminated, depending on the particular implementation without detracting from the essence of the disclosed embodiments.

Various embodiments of the disclosure may provide one or more non-transitory computer-readable storage media configured to store instructions that, in response to being executed, cause a system (such as, the example electronic device 102) to perform operations. The operations may include receiving a set of user posts and metadata associated with the received set of user posts. The operations may further include fitting a parameterized logistic function on the metadata associated with the received set of user posts. The operations may further include clustering each of the received set of user posts associated with corresponding metadata, based on the fitted parameterized logistic function. The operations may further include determining a category-prior associated with each of the received set of user posts, based on the clustered set of user posts. The operations may further include determining a set of multi-modal features associated with each of the received set of user posts. The operations may further include determining a feature likelihood for each of the received set of user posts, based on the determined set of multi-modal features. The operations may further include determining a final category associated with each of the received set of user posts, based on the determined category-prior and on the determined feature likelihood. The operations may further include rendering post categorization information based on the determined final category associated with each of the received set of user posts. The received set of user posts may be filtered based on the determined final category.

As used in the present disclosure, the terms "module" or "component" may refer to specific hardware implementations configured to perform the actions of the module or component and/or software objects or software routines that may be stored on and/or executed by general purpose hardware (e.g., computer-readable media, processing devices, etc.) of the computing system. In some embodiments, the different components, modules, engines, and services described in the present disclosure may be implemented as objects or processes that execute on the computing system (e.g., as separate threads). While some of the system and methods described in the present disclosure are generally described as being implemented in software (stored on and/or executed by general purpose hardware), specific hardware implementations or a combination of software and specific hardware implementations are also possible and contemplated. In this description, a "computing entity" may be any computing system as previously defined in the present disclosure, or any module or combination of modulates running on a computing system.

Terms used in the present disclosure and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

All examples and conditional language recited in the present disclosure are intended for pedagogical objects to aid the reader in understanding the present disclosure and the concepts contributed by the inventor to furthering the art and are to be construed as being without limitation to such specifically recited examples and conditions. Although embodiments of the present disclosure have been described in detail, various changes, substitutions, and alterations could be made hereto without departing from the spirit and scope of the present disclosure.

What is claimed is:

1. A method, executed by a processor, comprising:
   receiving a set of user posts and metadata associated with the received set of user posts;
   fitting a parameterized logistic function on the metadata associated with the received set of user posts;
   clustering each of the received set of user posts associated with corresponding metadata, based on the fitted parameterized logistic function;
   determining a category-prior associated with each of the received set of user posts, based on the clustered set of user posts;
   determining a set of multi-modal features associated with each of the received set of user posts;
   determining a feature likelihood for each of the received set of user posts, based on the determined set of multi-modal features;
   determining a final category associated with each of the received set of user posts, based on the determined category-prior and on the determined feature likelihood; and
   rendering post categorization information based on the determined final category associated with each of the received set of user posts,
   the received set of user posts is filtered based on the determined final category.

2. The method according to claim 1, wherein the received set of user posts corresponds to at least one of a social media post, news content, or a user comment on a topic, associated with a user.

3. The method according to claim 1, wherein the metadata associated with the received set of user posts corresponds to at least one of a user like received from another user on a user post of the received set of user posts, a user reaction received from another user on the user post, a sharing of the user post by another user, or a broadcast of the user post by another user.

4. The method according to claim 1, wherein a set of parameters associated with the parameterized logistic function corresponds to at least one of:
   a first parameter that indicates a number of times an initial like or share of a user post, of the received set of user posts, has to grow to reach a predefined number,
   a second parameter that corresponds to a behavior of an output of the parameterized logistic function, or
   a third parameter that corresponds to the predefined number and indicates a limiting value associated with the growth of the number of likes or shares of the user post.

5. The method according to claim 4, wherein the set of parameters corresponds to a genetic-based statistical model.

6. The method according to claim 1, wherein the clustering is based on an application of a k-means clustering technique on each user post of the received set of user posts fitted on the parameterized logistic function.

7. The method according to claim 1, wherein the determination of the category-prior associated with a user post of the received set of user posts is based on a normalized distance between a vector representation of the user post and a corresponding cluster centroid.

8. The method according to claim 1, wherein the determined set of multi-modal features correspond to at least one of:
   a term-frequency value of textual content of a user post of the received set of user posts,
   an inverse document frequency value of the textual content of the user post,
   a lexicon-based feature of the textual content,
   a set of slur or profanity words associated with the textual content,
   a set of parts-of-speech (POS) bigrams associated with the textual content,
   a set of topic-specific unigrams or bigrams associated with the textual content,
   a set of features associated with application of transformer models on the textual content
   a set of image features associated with the user post,
   a set of features corresponding to a histogram of image gradients of an image with the user post,
   a set of audio features associated with the user post, or
   a set of image frame features and corresponding audio frame features of a video associated with the user post.

9. The method according to claim 1, wherein the determination of the feature likelihood for each user post of the received set of user posts is based on a normalized distance between a vector representation of the user post and a corresponding category associated with a feature from the determined set of multi-modal features.

10. The method according to claim 1, further comprising:
    determining a posterior probability of a user post corresponding to a category of a set of categories associated with the received set of user posts, based on the determined category-prior and on the determined feature likelihood, wherein
      the determination of the posterior probability corresponds to the final category.

11. The method according to claim 10, wherein the determined posterior probability corresponds to a Bayesian probability model for the categorization of the received set of user posts.

12. The method according to claim 1, further comprising:
    receiving, based on the post categorization information, a user input indicative at least one of a removal of a user post of the received set of user posts or a suspension of a user account corresponding to the user post, wherein the received set of user posts is filtered based on the received user input.

13. One or more non-transitory computer-readable storage media configured to store instructions that, in response to being executed, cause an electronic device to perform operations, the operations comprising:
    receiving a set of user posts and metadata associated with the received set of user posts;
    fitting a parameterized logistic function on the metadata associated with the received set of user posts;
    clustering each of the received set of user posts associated with corresponding metadata, based on the fitted parameterized logistic function;
    determining a category-prior associated with each of the received set of user posts, based on the clustered set of user posts;
    determining a set of multi-modal features associated with each of the received set of user posts;
    determining a feature likelihood for each of the received set of user posts, based on the determined set of multi-modal features;
    determining a final category associated with each of the received set of user posts, based on the determined category-prior and on the determined feature likelihood; and
    rendering post categorization information based on the determined final category associated with each of the received set of user posts,
      the received set of user posts is filtered based on the determined final category.

14. One or more non-transitory computer-readable storage media according to claim 13, wherein the received set of user posts corresponds to at least one of a social media post, news content, or a user comment on a topic, associated with a user.

15. One or more non-transitory computer-readable storage media according to claim 13, wherein the metadata associated with the received set of user posts corresponds to at least one of a user like received from another user on a user post of the received set of user posts, a user reaction received from another user on the user post, a sharing of the user post by another user, or a broadcast of the user post by another user.

16. One or more non-transitory computer-readable storage media according to claim 13, wherein a set of parameters associated with the parameterized logistic function corresponds to at least one of:
    a first parameter that indicates a number of times an initial like or share of a user post, of the received set of user posts, has to grow to reach a predefined number,
    a second parameter that corresponds to a behavior of an output of the parameterized logistic function, or
    a third parameter that corresponds to the predefined number and indicates a limiting value associated with the growth of the number of likes or shares of the user post.

17. One or more non-transitory computer-readable storage media according to claim 13, wherein the clustering is based on an application of a k-means clustering technique on each user post of the received set of user posts fitted on the parameterized logistic function.

18. One or more non-transitory computer-readable storage media according to claim 13, wherein the determined set of multi-modal features correspond to at least one of:
- a term-frequency value of textual content of a user post of the received set of user posts,
- an inverse document frequency value of the textual content of the user post,
- a lexicon-based feature of the textual content,
- a set of slur or profanity words associated with the textual content,
- a set of parts-of-speech (POS) bigrams associated with the textual content,
- a set of topic-specific unigrams or bigrams associated with the textual content,
- a set of features associated with application of transformer models on the textual content
- a set of image features associated with the user post,
- a set of features corresponding to a histogram of image gradients of an image with the user post,
- a set of audio features associated with the user post, or
- a set of image frame features and corresponding audio frame features of a video associated with the user post.

19. One or more non-transitory computer-readable storage media according to claim 13, wherein the operations further comprise:
- receiving, based on the post categorization information, a user input indicative at least one of a removal of a user post of the received set of user posts or a suspension of a user account corresponding to the user post, wherein the received set of user posts is filtered based on the received user input.

20. An electronic device, comprising:
- a memory storing instructions; and
- a processor, coupled to the memory, that executes the stored instructions to perform a process comprising:
  - receiving a set of user posts and metadata associated with the received set of user posts;
  - fitting a parameterized logistic function on the metadata associated with the received set of user posts;
  - clustering each of the received set of user posts associated with corresponding metadata, based on the fitted parameterized logistic function;
  - determining a category-prior associated with each of the received set of user posts, based on the clustered set of user posts;
  - determining a set of multi-modal features associated with each of the received set of user posts;
  - determining a feature likelihood for each of the received set of user posts, based on the determined set of multi-modal features;
  - determining a final category associated with each of the received set of user posts, based on the determined category-prior and on the determined feature likelihood; and
  - rendering post categorization information based on the determined final category associated with each of the received set of user posts,
    the received set of user posts is filtered based on the determined final category.

* * * * *